(12) United States Patent
Dvorkis et al.

(10) Patent No.: US 6,220,514 B1
(45) Date of Patent: *Apr. 24, 2001

(54) ELECTRO-OPTICAL SCANNER HAVING STATIONARY, MULTI-SURFACE MIRROR HAVING SURFACES WITH APLANAR PROFILES

(75) Inventors: Paul Dvorkis, Stony Brook; Edward Barkan, Miller Place; Howard Shepard, Great River; Vladimir Gurevich, Bohemia; Mark Krichever, Hauppauge; Boris Metlitsky; David Tsi, both of Stony Brook; Raj Bridgelall, Mount Sinai; Duanfeng He, Ronkonkoma; Joseph Katz, Stony Brook; Richard Isaac, East Northport; Joel Kahn, Rockville, all of NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/328,948

(22) Filed: Jun. 9, 1999

Related U.S. Application Data

(60) Division of application No. 09/009,231, filed on Jan. 20, 1998, now Pat. No. 5,988,502, which is a continuation-in-part of application No. 08/405,585, filed on Mar. 17, 1995, now abandoned, which is a continuation-in-part of application No. 08/268,982, filed on Jun. 30, 1994, now Pat. No. 5,742,038, which is a continuation-in-part of application No. 08/314,519, filed on Sep. 28, 1994, now Pat. No. 5,506,392, which is a division of application No. 08/109,021, filed on Aug. 19, 1993, now Pat. No. 5,352,922, which is a division of application No. 07/735,573, filed on Jul. 25, 1991, now Pat. No. 5,278,397.

(51) Int. Cl.[7] ............................ G06K 7/10; G02B 26/00

(52) U.S. Cl. .................. 235/462.37; 235/462.4

(58) Field of Search ............ 235/462.37, 462.4, 235/462.22, 462.23

(56) References Cited

U.S. PATENT DOCUMENTS

| | | |
|---|---|---|
| 3,051,051 | 8/1962 | Jeffree . |
| 3,396,344 | 8/1968 | Broom . |
| 3,780,270 | 12/1973 | Faulkner et al. . |
| 3,790,756 | 2/1974 | Graves et al. . |
| 3,871,748 | 3/1975 | Day . |
| 4,199,816 | 4/1980 | Humphrey . |
| 4,360,798 | 11/1982 | Swartz et al. . |
| 4,369,361 | 1/1983 | Swartz et al. . |
| 4,500,776 | 2/1985 | Laser . |
| 4,508,686 | 4/1985 | Shaber et al. . |
| 4,538,895 | 9/1985 | Higgins et al. . |
| 4,555,164 | 11/1985 | Feinbloom . |
| 4,560,862 | 12/1985 | Eastman et al. . |
| 4,570,057 | 2/1986 | Chadima, Jr. et al. . |
| 4,606,660 | 8/1986 | Bradshaw et al. . |
| 4,641,018 | 2/1987 | Mazumder et al. . |
| 4,652,750 | 3/1987 | Eastman et al. . |
| 4,705,939 | 11/1987 | Ulinski, Sr. . |
| 4,721,860 | 1/1988 | Troendle . |
| 4,766,298 | * 8/1988 | Meyers ................. 235/462 |
| 4,777,357 | 10/1988 | Harada et al. . |
| 4,795,281 | 1/1989 | Ulinski, Sr. et al. . |

(List continued on next page.)

FOREIGN PATENT DOCUMENTS 6-150039   5/1994   (JP) .

*Primary Examiner*—Karl D. Frech
(74) *Attorney, Agent, or Firm*—Kirschstein, etal.

(57) ABSTRACT

An optical scanner for reading indicia having areas of different light reflectivity, such as bar code symbols includes a stationary, multi-surface, fold mirror having a first surface of a first aplanar profile and a second surface of a second, different aplanar profile.

11 Claims, 14 Drawing Sheets

U.S. PATENT DOCUMENTS

| | | |
|---|---|---|
| 4,820,911 | 4/1989 | Arackellian et al. . |
| 4,822,986 | 4/1989 | Guthmueller et al. . |
| 4,825,048 | 4/1989 | Altmann et al. . |
| 4,826,269 | 5/1989 | Streifer et al. . |
| 4,860,226 | 8/1989 | Martin et al. . |
| 4,894,790 | 1/1990 | Yotsuya et al. . |
| 4,896,026 | 1/1990 | Krichever et al. . |
| 4,916,298 | 4/1990 | Raphael . |
| 4,933,538 | 6/1990 | Heiman et al. . |
| 4,980,544 | 12/1990 | Winter . |
| 4,992,649 | 2/1991 | Mampe et al. . |
| 5,013,895 | 5/1991 | Iggulden et al. . |
| 5,014,831 | 5/1991 | Wawra et al. . |
| 5,034,904 | 7/1991 | Moy . |
| 5,047,617 | 9/1991 | Shepard et al. . |
| 5,064,258 | 11/1991 | Inokuchi et al. . |
| 5,067,093 | 11/1991 | Przybylowicz et al. . |
| 5,073,954 | 12/1991 | Van Tyne et al. . |
| 5,081,639 | 1/1992 | Snyder et al. . |
| 5,115,334 | 5/1992 | Tomita . |
| 5,170,277 | 12/1992 | Bard et al. . |
| 5,179,271 * | 1/1993 | Lindacher et al. .................... 235/467 |
| 5,194,720 | 3/1993 | Reinnagel et al. . |
| 5,200,597 | 4/1993 | Eastman et al. . |
| 5,229,591 | 7/1993 | Heiman et al. . |
| 5,235,167 | 8/1993 | Dvorkis et al. . |
| 5,250,791 | 10/1993 | Heiman et al. . |
| 5,280,161 | 1/1994 | Niwa . |
| 5,327,451 | 7/1994 | Walker et al. . |
| 5,332,892 | 7/1994 | Li et al. . |
| 5,420,411 | 5/1995 | Salatto, Jr. et al. . |
| 5,475,208 * | 12/1995 | Marom ................................. 235/467 |
| 5,484,990 * | 1/1996 | Lindacher et al. .................... 235/467 |
| 5,572,008 * | 11/1996 | Sakai et al. .......................... 235/467 |
| 5,576,529 | 11/1996 | Koenck et al. . |
| 5,591,954 | 1/1997 | Spencer . |
| 5,640,001 | 6/1997 | Danielson et al. . |
| 5,693,930 | 12/1997 | Katoh et al. . |
| 5,742,038 | 4/1998 | Dvorkis et al. . |
| 5,859,417 | 1/1999 | Dvorkis et al. . |

* cited by examiner

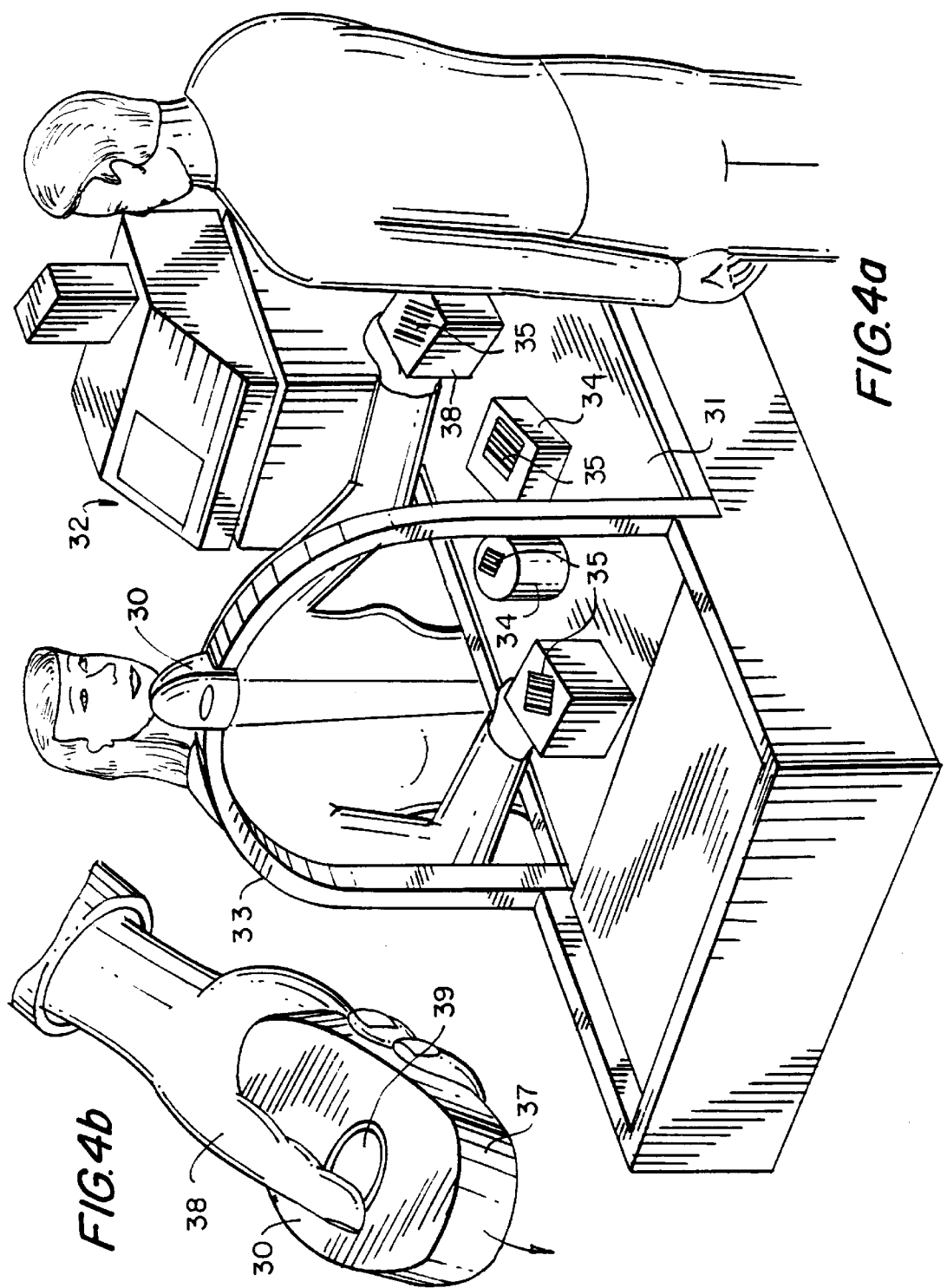

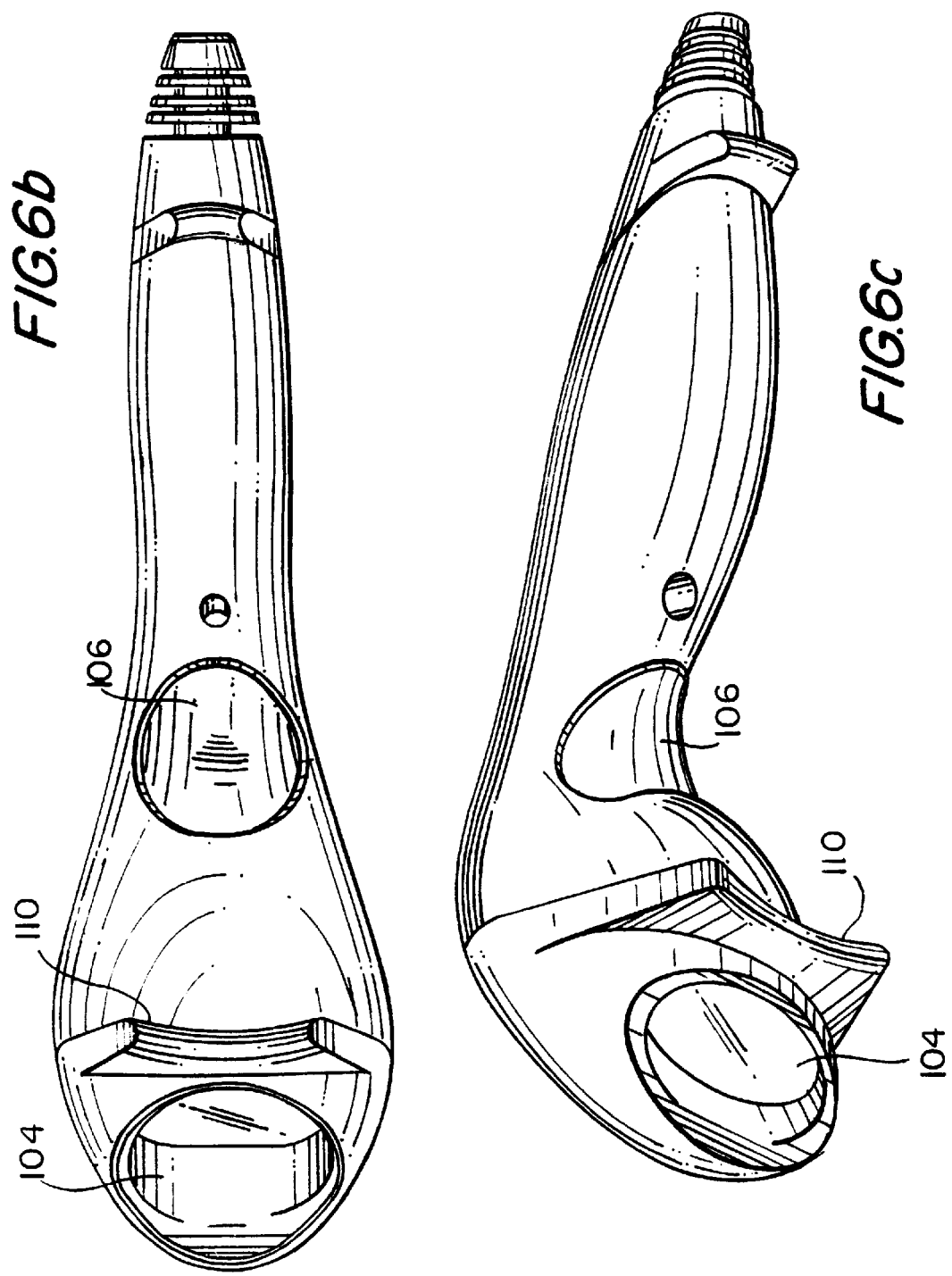

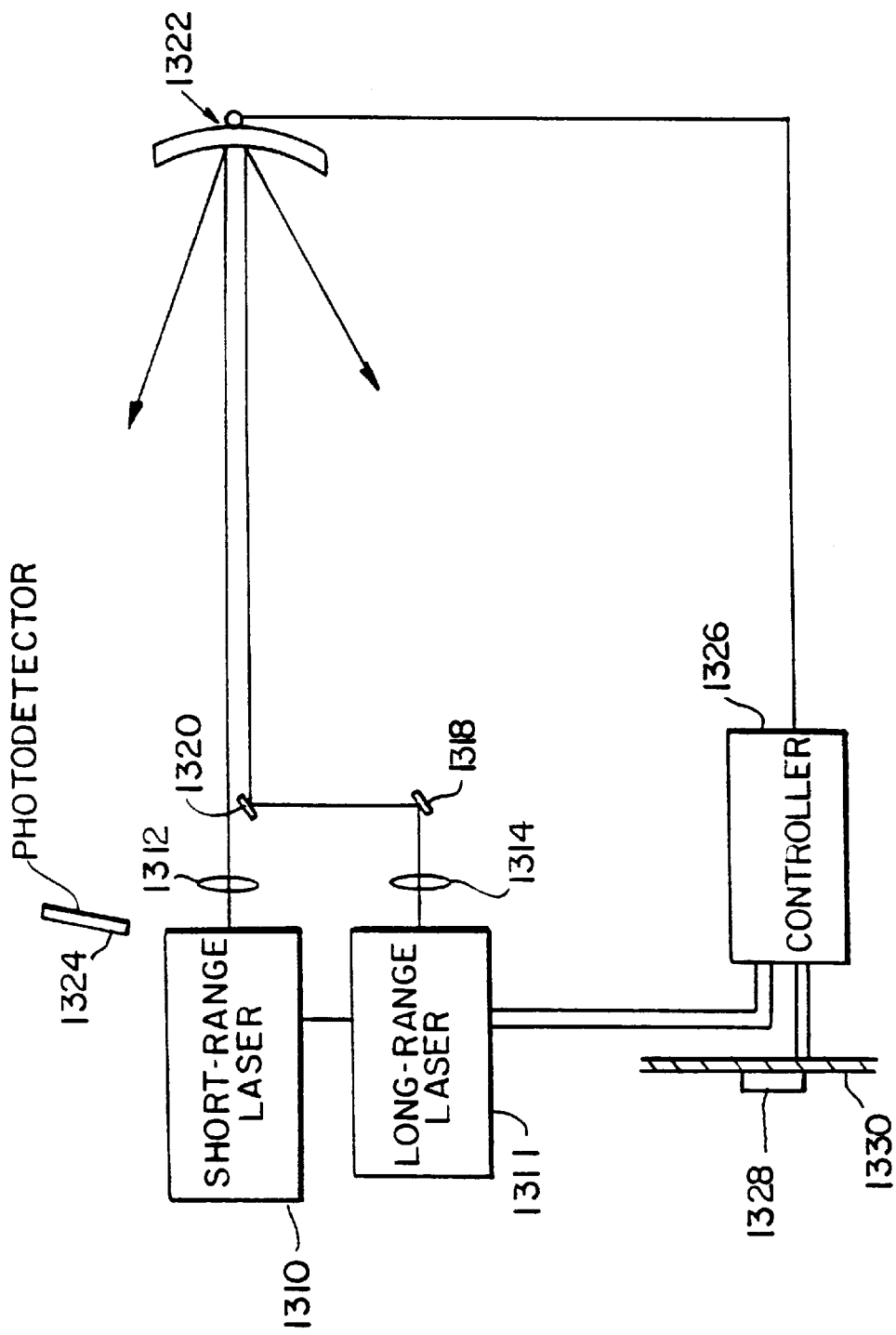

ELECTRO-OPTICAL SCANNER HAVING STATIONARY, MULTI-SURFACE MIRROR HAVING SURFACES WITH APLANAR PROFILES

REFERENCES TO RELATED APPLICATION

This application is a division of U.S. patent application Ser. No. 09/009,231, filed Jan. 20, 1998, now U.S. Pat. No. 5,988,502 which, in turn, is a continuation-in-part of U.S. patent application Ser. No. 08/405,585, filed Mar. 17, 1995, now abandoned, which is a continuation-in-part of U.S. patent application Ser. No. 08/268,982, filed Jun. 30, 1994, now U.S. Pat. No. 5,742,038, which is a continuation-in-part of U.S. patent application Ser. No. 08/314,519, filed Sep. 28, 1994, now U.S. Pat. No. 5,506,392, which is a divisional of U.S. patent application Ser. No. 08/109,021, filed Aug. 19, 1993, now U.S. Pat. No. 5,352,922, which is a divisional of U.S. patent application Ser. No. 07/735,573, filed Jul. 25, 1991, now U.S. Pat. No. 5,278,397, and is related to U.S. patent application Ser. No. 08/864,452, filed May 28, 1997, now allowed.

BACKGROUND OF THE INVENTION

1. Field of the Invention

The invention relates generally to optical scanners, and in particular to scanners having dual or multiple working ranges.

Most optical scanners such as bar code scanners are adapted for use at a particular distance, or a range of distances, from an indicia to be scanned. If the user holds the scanner too close to the indicia, or too far away, the indicia and/or the flying spot beam will not be in focus, and decoding will not be possible.

Such scanners may not be particularly convenient in environments where a series of indicia to be read are presented to the scanner at various distances, and where it is difficult or impossible for the user to alter the distance between the scanner and the indicia. To deal with such situations, attempts have been made to expand the acceptable working range of conventional scanners, to give the user as much leeway as possible, and also to provide multi-distance scanners which can operate, for example, at a first working range or at a second working range according to the user's preference or requirements. One possibility is for the provision of a two-position switch on the scanner, with the scanner operating at a first working distance in a first position of the switch and at a second working distance in a second position. A disadvantage of such scanners is that they require additional moving parts to provide for operation at the two separate working ranges. Such systems are also not "automatic" in the sense that the user has manually to select the correct working range, according to the distance of the current indicia to be read; if the incorrect working range is chosen, a decode will not result.

One of the difficulties that bar code reader designers face when attempting to produce increased working ranges is that the greater the working range, and the greater the range of possible indicia that might be read, the lower tends to be the resultant signal to noise ratio in light that is reflected from the indicia. One approach for dealing with this involves the provision of non-conventional optics, in which the optics associated with either the laser or with the photodetector have two distinct focal points. An example of this is shown in U.S. Pat. No. 5,332,892, which is commonly assigned with the present application. In the device shown in that document, the two focal points are associated with corresponding circuitry to provide two separate channels of data derived from the scanned bar code. The two channels have differing resolutions. As the working angle and density vary, at least one of the resolutions is likely to be appropriate for sensing all or most of the bar coded data, regardless of the distance of the bar code with respect to the scanner and/or the size or density of the code. The scanning beams of bar code readers are typically derived from laser diodes. Such diodes are robust and relatively inexpensive, but they do suffer from the disadvantage that the beam emerging from a laser diode is astigmatic. The astigmatic laser diode can be characterized as having two apparent light sources spaced apart from each other along the optical path. One of the light sources lies in a horizontal plane, appears to be coming from inside the laser diode chip, and has a low angular divergence. The other apparent light source lies in a vertical plane, appears to be coming from a facet of the chip, and has a high angular divergence. The two apparent light sources, which are spaced apart from each other by typically about 20 micrometers, form two beam waists in different planes and in different directions, as measured relative to the planar junction of the chip.

The resultant relatively complex beam profile may need selective shaping before it can efficiently be used in an optical scanner. Some methods of providing such beam shaping are described in our co-pending U.S. patent application Ser. No. 08/268,982, filed Jun. 30, 1994, the teachings of which are incorporated herein by reference.

A simpler option is simply to provide separate long and short range visible laser diodes, as is suggested in our earlier patent U.S. Pat. No. 5,420,411.

A further problem associated with known arrangements is that of distinguishing the respective images received corresponding to objects in each working range.

The present invention, in various other embodiments, further relates to optical scanning stations having a conveyor for moving articles carrying indicia to be read past an optical scanner, and to optical scanners having means for manually or automatically selecting one of a plurality of desired scan patterns.

The invention further relates, in yet further embodiments, to scanners having an extended working range using two lasers, each focused to cover a different portion of the scan distance. Present systems turn on one laser for a full scan, and then the second laser for the next scan, alternating on a scan-by-scan basis. Since, in general, only one of the lasers is capable of reading a bar pattern at any given distance, this technique typically doubles the length of time that it takes to generate a successful decode over single-laser embodiments. There is a need to regain the aggressiveness of a one-laser scanner, while maintaining the range benefits of the two-laser system. One device making use of two lasers is disclosed in our application Ser. No. 08/405,585, filed Mar. 17, 1995, now abandoned, the disclosure of which is incorporated herein by reference.

SUMMARY OF THE INVENTION

Objects of the Invention

It is an object of the present invention at least to alleviate the problems of the prior art.

It is a further object to provide a multiple working range optical system, for example for a scanner arrangement capable of distinguishing between respective images corresponding to images in different working ranges.

It is yet a further object of the invention to provide a multiple working range optical scanner arrangement having a minimum of imaging and image-recording elements.

It is yet a further object of the invention to provide an optical scanner capable of being easily and conveniently mounted for optimum operation and user comfort.

It is yet a further object of the invention to provide a convenient and easily-operable optical scanning station, for example for use at a point of sale.

It is a further object to provide an optical scanner capable of generating different scan patterns using a single scanning mechanism.

It is yet a further object to provide an optical scanner which maintains the range benefits of a two-laser system, while providing the rapid decoding typical of a one-laser system.

According to the present invention there is provided a multi scan-pattern optical scanner including a laser assembly for producing a plurality of laser beams of differing wavelengths and a scanning mechanism including a wavelength selector for selectively passing a beam of predefined wavelength, thereby producing at least a first scan pattern from a beam which is passed by the selector and a second scan pattern from a beam which is stopped by the selector.

A device of this type allows for the creation of multiple scan patterns without the need to have individual scanning mechanisms for each pattern. In a preferred embodiment, parts of the scanning mechanism are coated or otherwise provided with filters to absorb, or to prevent the reflection of, at least one of the beams. Alternatively, parts of the mechanism may be coated so that only those coated parts reflect one of the beams. Preferably, the coatings may be thin coatings which achieve their reflective/absorptive effect by optical interference.

It would also be possible to provide holographic optical elements and/or diffraction gratings to separate two laser beams of differing wavelengths, and thereby allow them to be deflected differently by a single scanning mechanism.

Preferably, each laser is provided with its own optical assembly, providing individual focusing and allowing each laser to scan efficiently at a given working distance. To extend the overall working range even further, more than two lasers could be used, each having its own working distance.

The invention extends to any individual feature described above or set out in the specific description, and to any compatible combination of features. It is to be understood, in particular, that features shown in relation to one figure may be combined, where compatible, with features shown in connection with any other figure.

BRIEF DESCRIPTION OF THE DRAWINGS

The invention may be carried into practice in a number of ways and several specific embodiments will now be described, by way of example, with reference to the accompanying drawings, in which:

FIG. 1a shows a multiple range optical system according to an embodiment of the present invention;

FIG. 1b is an end view of the multi-focus lens used in the arrangement of FIG. 2a;

FIG. 3b shows a user carrying the optical scanner in the mounting option of FIG. 3a;

FIG. 4a shows an alternative mounting option for an optical scanner;

FIG. 4b shows the optical scanner of FIG. 4a being used in dismounted mode;

FIGS. 6a–6c show an exemplary housing for a bar code scanner for use with any of the embodiments of the present invention;

FIG. 11 shows yet another embodiment, namely a dual-range scanner using dual laser beams;

DETAILED DESCRIPTION OF THE PREFERRED EMBODIMENTS

Figure 1:
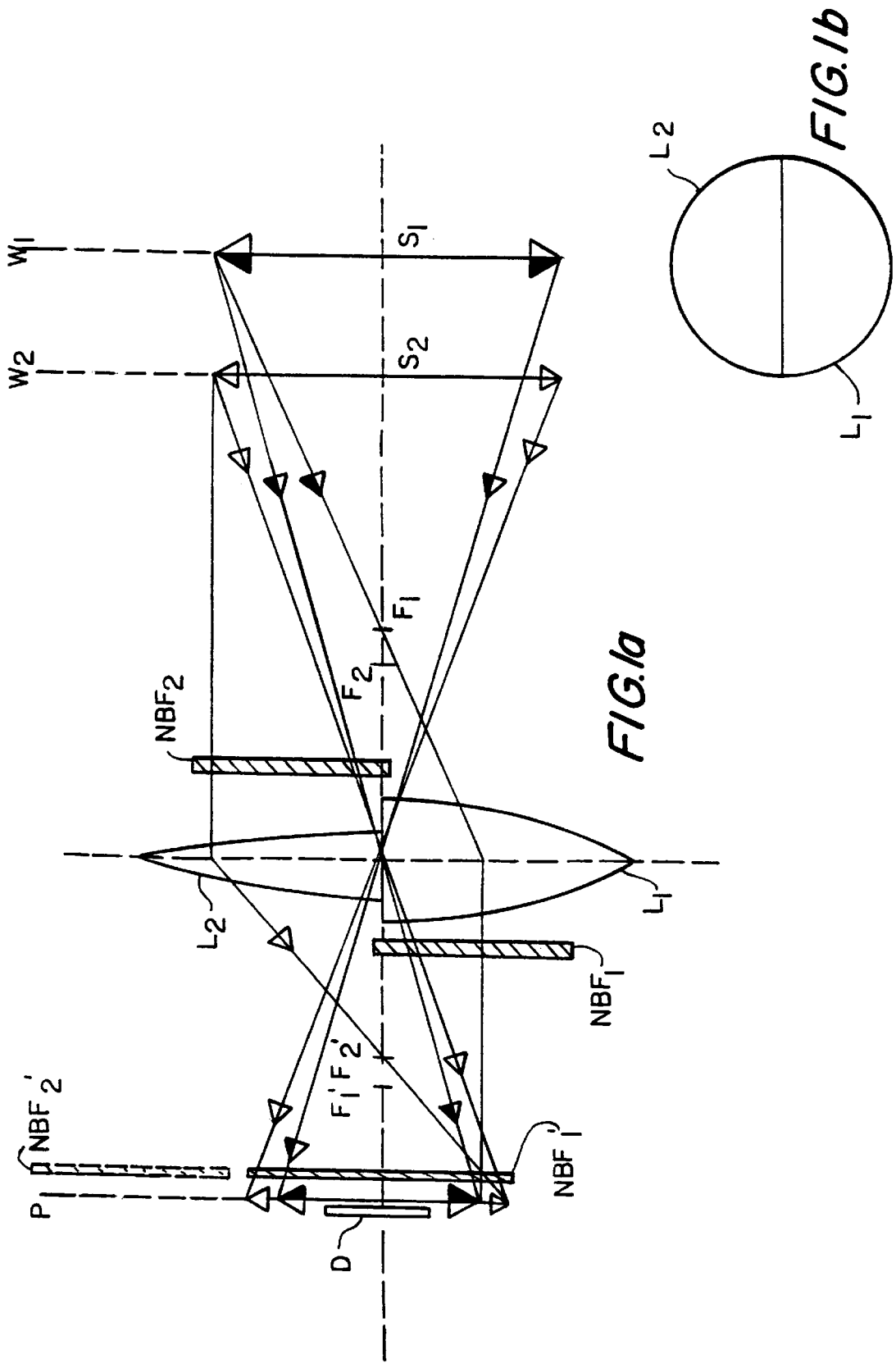

Referring first to FIG. 1, there is shown a multiple working range optical system according to one embodiment of the present invention, forming effectively an imaging auto-focusing device. The arrangement comprises a lens system $L_1, L_2$ and a narrow band filter system $NBF_1, NBF_2$. Although any number of lenses and filters can be included allowing, as will become clear from the following discussion, a corresponding number of working ranges, in the present embodiment for the purposes of simplicity a system including two lenses and associated filters is shown, providing two working ranges.

The lens system shown in FIGS. 1a and 1b comprises two semi-circular convex lens elements $L_1$, $L_2$ with respective focal lengths $F_1, F_2$. Two working ranges $W_1, W_2$ are selected and the lens power of the respective lens element is selected such that the conjugate image planes corresponding to the object planes defined by working ranges $W_1, W_2$ coincide at plane P. Accordingly a first object $S_1$ at working range $W_1$ is focused onto plane P by lens element $L_1$. Additionally a second object $S_2$ at working range $W_2$ is focused by lens element $L_2$ at plane P. Thus the system is able automatically to focus objects at different ranges. It will be understood that, in the case of a bar code reader, the objects $S_1, S_2$ would be bar code symbols to be read. Because the conjugate image planes coincide for the working ranges, only a single detector D is required; this could, for example, be a charge coupled device array, or conventional film. Furthermore complex beam propagation or mirror assemblies are not required. In order to increase the number of working ranges the lens system is simply enhanced by including further lens elements and associated filters arranged to image objects in additional working ranges onto the plane P. In such a case, each lens element would form a segment of a circular multi-focus lens.

Associated with each lens element $L_1$, $L_2$ is a respective spectral narrow band filter $NBF_1$, $NBF_2$. The filters $NBF_1$, $NBF_2$ are arranged to pass different wavebands of light received from the objects $S_1, S_2$. As a result the images of the objects $S_1$, $S_2$ at plane P are composed of light of different wavelengths and can be resolved from one another. In order to do this, the system is provided with additional movable, filters $NBF_1'$, $NBF_2'$. Each filter can be moved into position in front of the detector D to allow light of the relevant wavelength to pass dependent on which working range is selected. If the working range $W_1$ is selected, light from the object $S_1$ passes through the lens element $L_1$, is filtered at $NBF_1$, and then passes through the movable filter $NBF_1'$ (now in position in front of the detector D); light which may have passed through $NBF_2$ and lens element $L_2$ is blocked at $NBF_1'$ and so cannot form an image at D. If the working range $W_2$ is selected, $NBF_2'$ is moved into position, and $S_2$ is imaged; light from $S_1$ passing through $L_1$ and $NBF_1$ is then blocked at $NBF_2'$.

Figure 2:
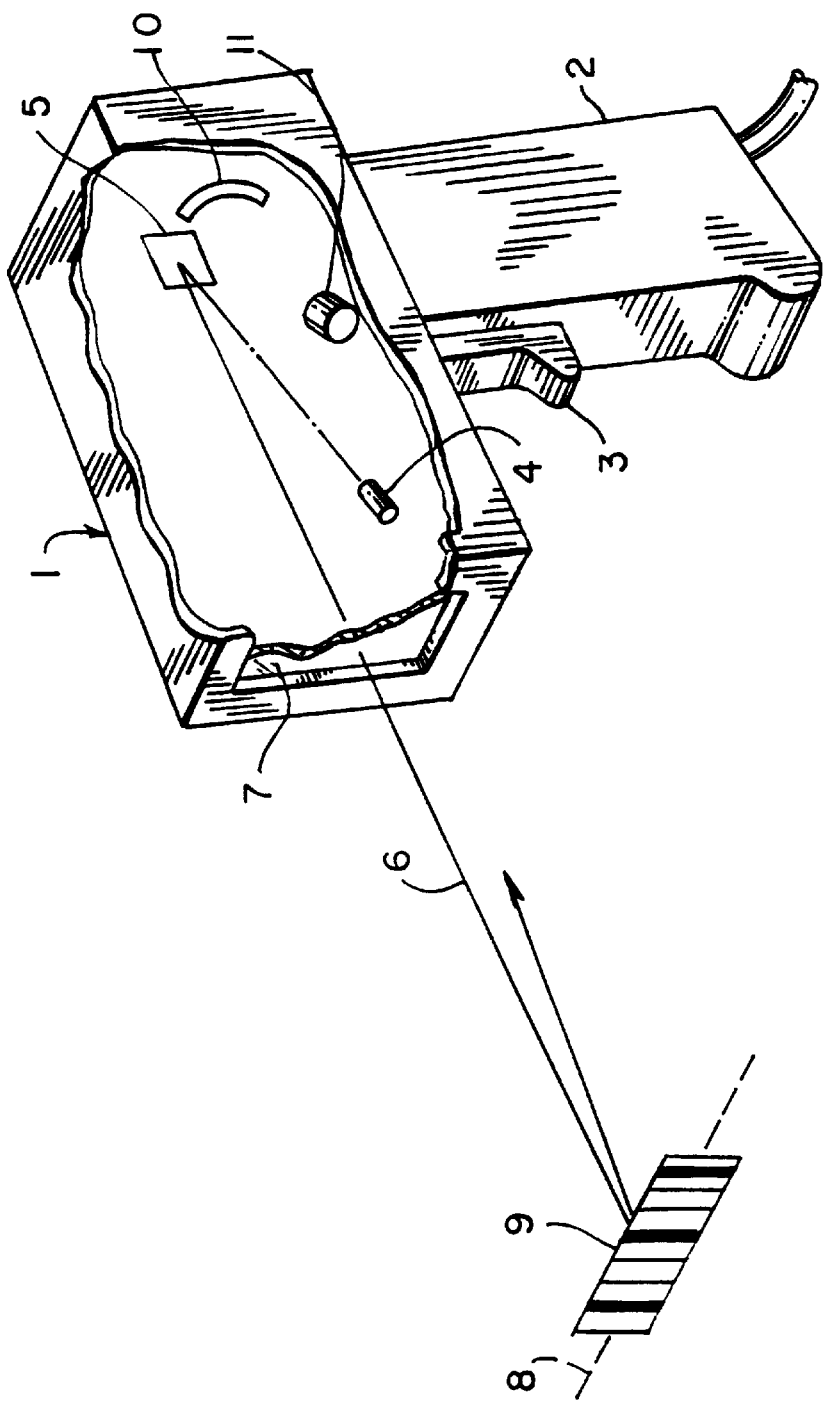
FIG. 2 shows a typical bar code scanner in conjunction with which the present invention may be implemented.

FIG. 2 illustrates an exemplary hand-held laser scanner suitable for use with the embodiment of FIG. 1, or indeed suitable for use with any other compatible embodiments to be subsequently described.

The scanner of FIG. 2 comprises a main body 1 having a graspable hand portion 2 which carries a trigger 3. Within the body 1 is a laser module 4. Light from the laser module 4 is arranged to shine onto an oscillating mirror 5. The resulting beam 6 passes out of the housing via a window 7. The mirror 5 is arranged to oscillate in such a way that the beam 6 traces out a scan line 8 across an indicia 9 to be recorded. Light reflected back from the indicia passes through the window 7, is collected by a collecting mirror 10, and is reflected to a photodetector 11. The optical signal is then converted into an electrical signal and the features of the indicia 9 determined.

In order to modify the bar code scanner a multiple working range optical system described in detail below is included in the system. The system can be inserted at an appropriate point in the path of the light beam reflected from the indicia 9, for example between the window 7 and the collecting mirror 10 or between the collecting mirror 10 and the photodetector 11. Indeed components of the standard bar code scanner such as the collecting mirror can be removed and replaced by the optical system according to the present invention.

Figure 3C:
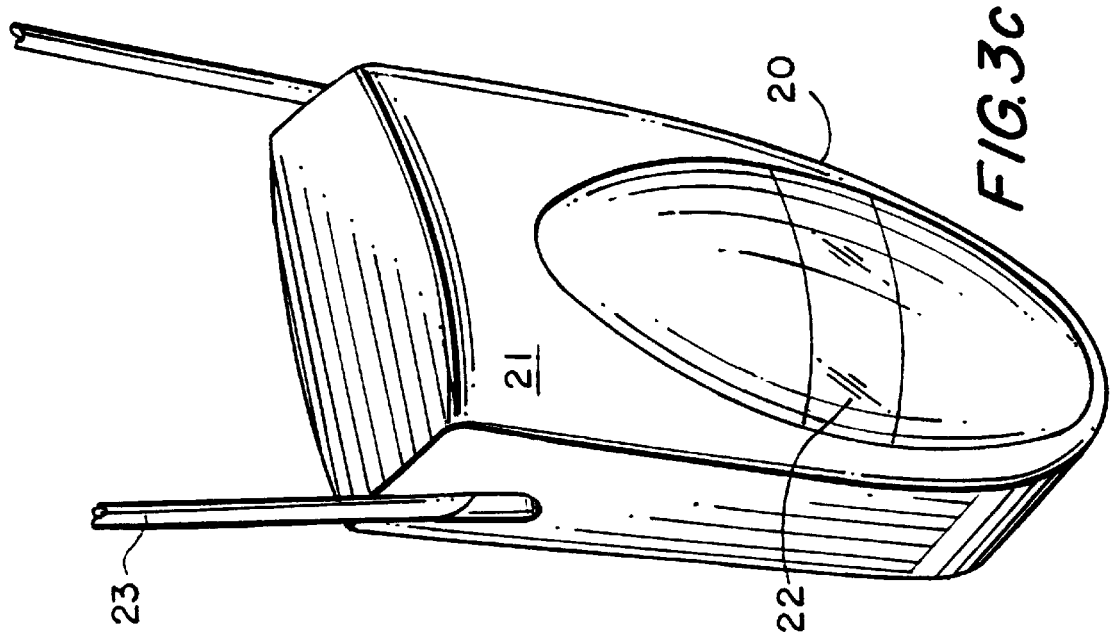
Figure 3B:
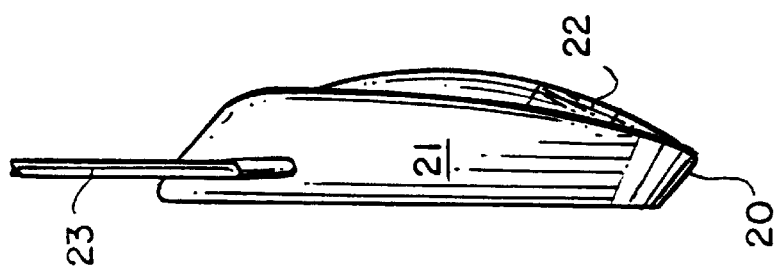
Figure 3A:
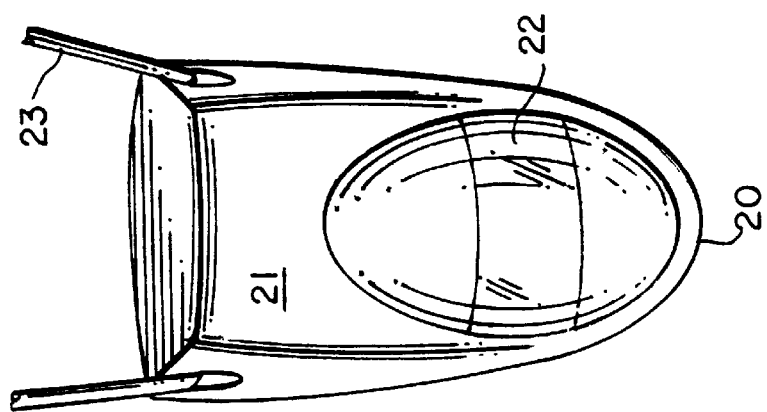
FIG. 3a shows a mounting option for an optical scanner.

The arrangement of FIG. 1 may, in the preferred embodiment, be used in association with the housing shown in FIGS. 3a–3d. FIGS. 3a–3c show from left to right, a front, side and perspective view of a pendant-held scanner 20. As discussed below in more detail with reference to FIG. 5 the scanner 20 includes a housing 21 in which are included a light beam generating means such as a laser or light emitting diode, a light-beam-directing means such as a lens system, a scanner window 22 and a detecting means such as a CCD array. The light beam passes through the scanner window, is reflected by a printed indicia such as a bar code symbol and returns to be detected by the detecting means.

Figure 3D:
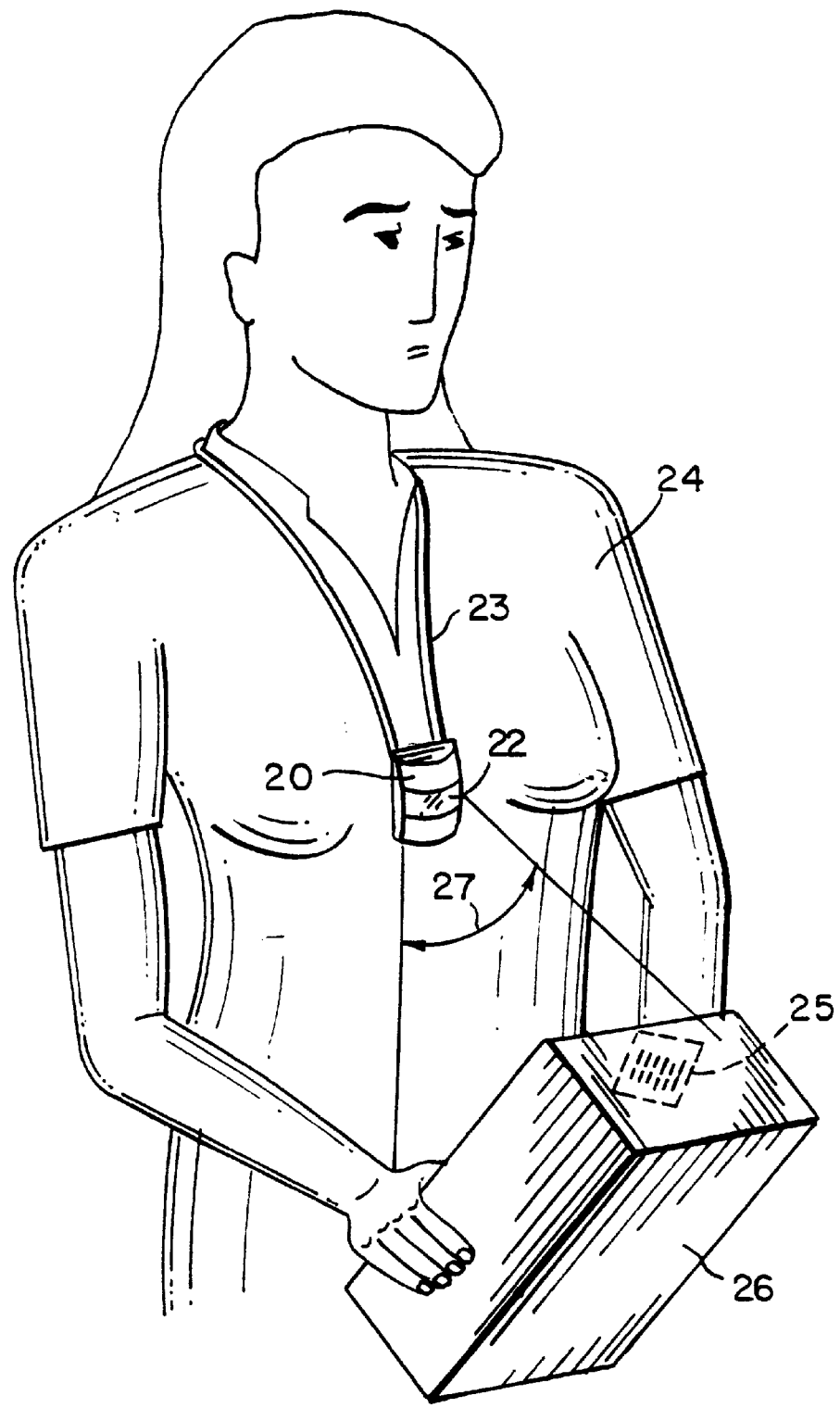

It will be seen that the scanner 20 is mounted on a strap 23 and, as shown in FIG. 3d, is carried by a user 24 with the strap 23 around the neck of the user 24. Accordingly if the user wishes to read a bar code symbol 25 on an item 26 the item 26 is simply positioned with the bar code symbol 25 pointing generally towards the user and the bar code symbol 25 is read automatically by the pendant scanner 20. It will be seen that the scanner window 22 is preferably located on the pendant scanner so as to face outwardly.

It will be seen that this arrangement can be advantageously used in association with the multiple range optical scanner system described above; the working ranges of the scanner can be determined to correspond with parameters determined ergonomically by the user; for example a first working range can correspond to the arrangement shown in FIG. 3d in which the item 26 is held at the user's waist level, and a second working range can correspond to an item being held at arms length. The scan area of the scanner 20 is shown in FIG. 3d at 27.

FIGS. 4a and 4b show alternative mountings for an optical reader. FIG. 4a shows a point of sale application which could be applied equally in other applications whether the operator remains stationary and it is appropriate to move items to be scanned past the scanner rather than vice versa. A scanner 30 is shown mounted over a conveyor 31 at a point of sale 32. The scanner 30 is mounted on a support such as an arch 33 over a conveyor 31. As items 34 on the conveyor 31 pass under the arch 33 bar code symbols 35 on the items 34 are read by the scanner 30. In the embodiment shown the scanner 30 is roughly the shape of a quadrant of an ovoid with two substantially planar faces, a side face extending in the direction of the long axis of the ovoid and an end face extending in the direction of the short axis to the ovoid. The end face carries a scanning window 37 as shown in FIG. 4b. When mounted on the arch 33 the scanner 30 is oriented with its end face and scanning window 37 pointing downwards towards the bar code symbol 35 to be read.

In a further preferred option the scanner 30 can be detachably mounted on the arch 33 for example by including resilient gripping means on the arch 33. Accordingly the scanner 30 can be removed from the arch 33 and held in the user's hand 38 as shown in FIG. 4b. The end face and scanning window point outwardly away from the user's body and a control button 39 is placed on the planar side face so as to be easily operable by the user's thumb. The curved surface of the scanner 30 then fits snugly and comfortably into the user's hand 38. The scanner 30 can be simply aimed at an article to be scanned and operated by actuating button 39. As a result the scanner 30 can be used in a wide variety of applications and in particular, for example, applications where items are too bulky or heavy or inappropriately positioned to be passed under the arch 31 and scanned.

Figure 5:
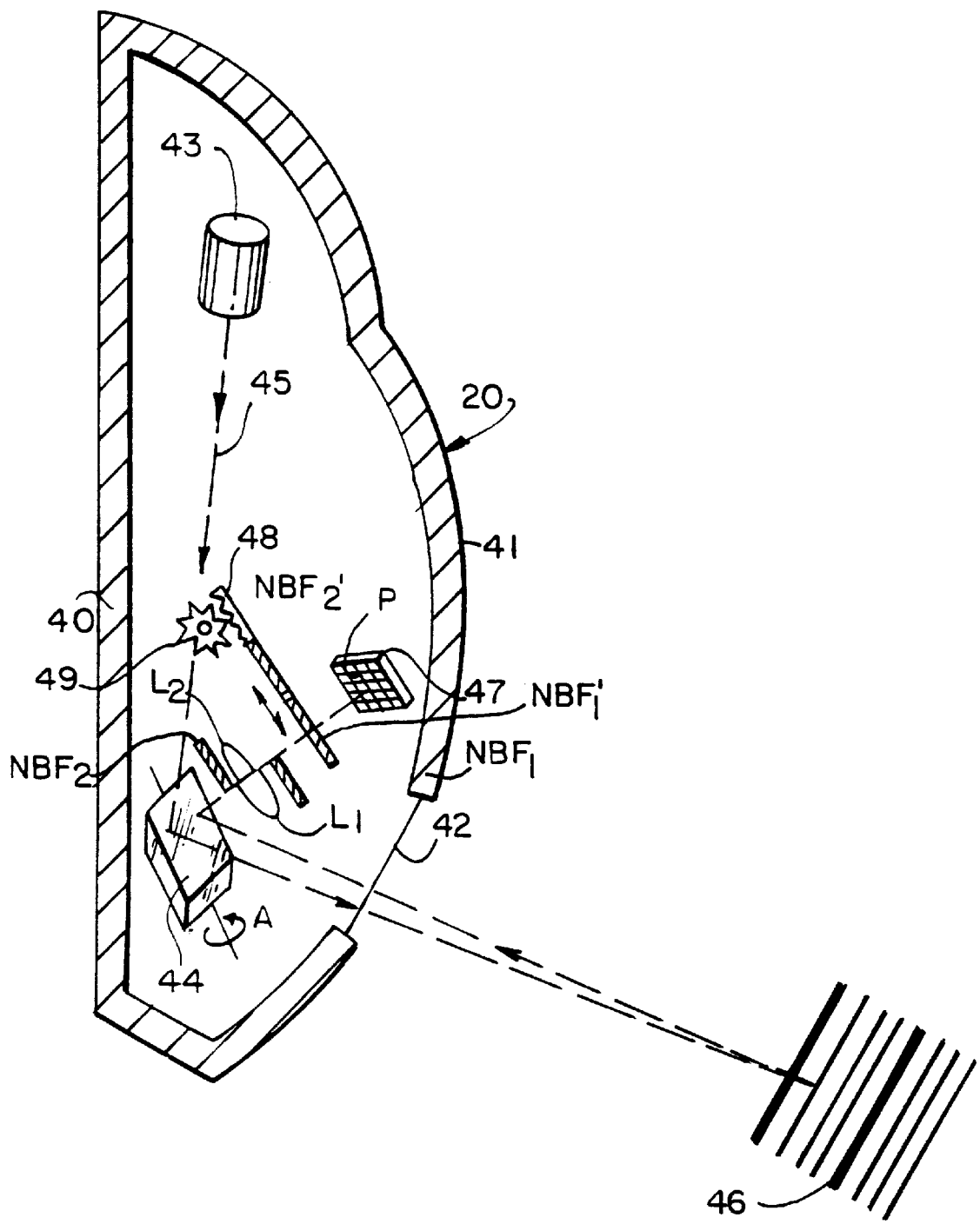
FIG. 5 shows the internal arrangement of the scanner of FIG. 3a incorporating the multiple range optical system of FIG. 1.

FIG. 5 shows in more detail the pendant scanner of FIGS. 3a–3d incorporating the multiple working range optical arrangement of FIG. 1a. The scanner 20 is shown in partial cross section and partly from one side. The scanner comprises an elongate body having a long broad face 40 for resting against the user's chest when used as a pendant and an opposing face 41 in which is positioned a scanning window 42. The opposing face 41 is preferably slightly curved or otherwise inclined such that the scanning window points at a shallow downwards angle as ergonomically appropriate when the user is holding an item to be scanned at waist level.

The scanner 20 includes a light source 43 such as a laser or LED and a scanning mirror 44 which is rotated in a known manner to oscillate about an axis A. The light beam 45 generated by the laser 43 is reflected by the mirror 44 through the scanning window 42 onto a printed indicia such as a bar code symbol 46 to be read. Light reflected from the bar code symbol 46 passes back through the window 42 and is reflected once more by the mirror 44 via the lens system $L_1$, $L_2$ onto a detector 47 such as a CCD array aligned with the image conjugate plane P. As discussed above, narrow band filters $NBF_1'$, $NBF_2'$ are associated with the lenses $L_1$, $L_2$ respectively and can be moved in the direction implicated by the double-headed arrows in and out of position in order to select a desired working range. The filters are mounted for reciprocal movement by means of a rack 48 which is driven back and forth by a toothed wheel 49 driven by a motor and controller (not shown). Of course, any suitable method can be used.

It will be appreciated that the lens elements $L_1$, $L_2$ can be replaced by any suitable optical arrangements such as holographic elements, prisms or gratings. The narrow band filters may be of any known type.

The desired working range can be selected manually by user input, or automatically by identifying for which working range an object is focused, for example by introducing each of the filters in turn and ascertaining which of the narrow band images is in focus.

Figure 6A:
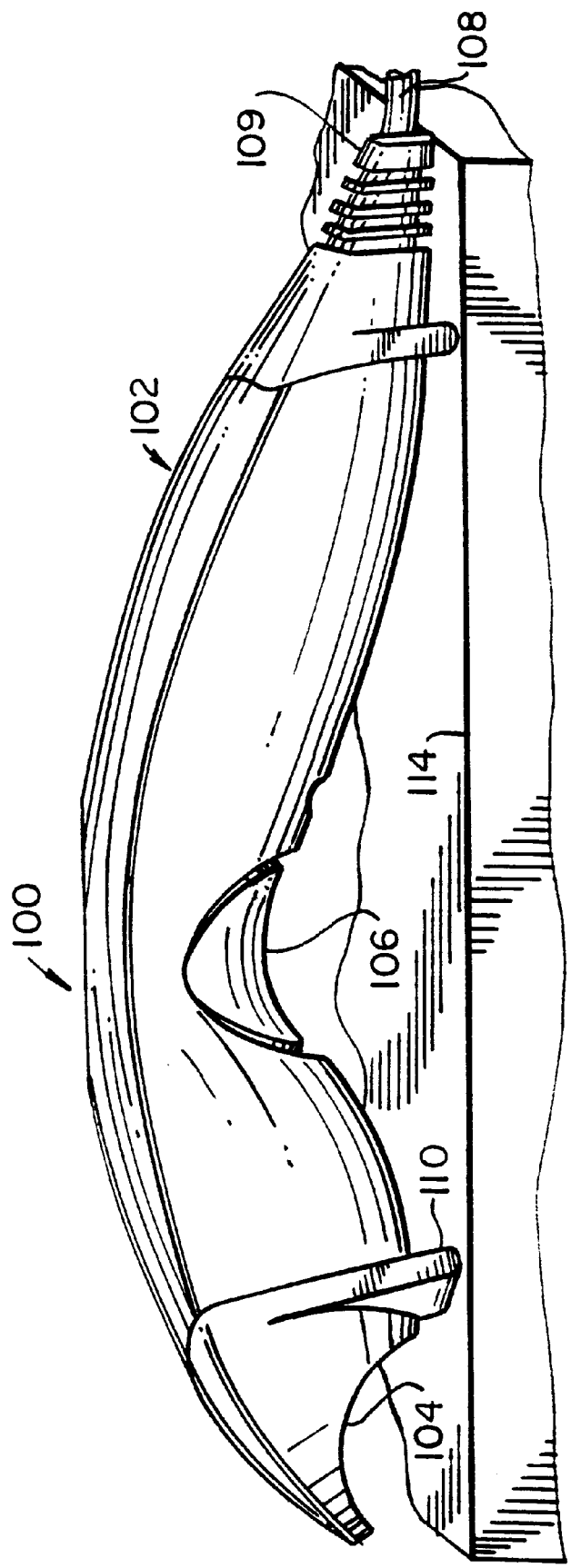

An alternative scanner housing is illustrated schematically in FIGS. 6a–6c. This is suitable for use with the embodiment of FIG. 1, and/or for the embodiments of FIG. 7 onwards.

The scanner housing of FIGS. 6a to 6c comprises an integrally molded and shaped head portion 100 and manually-graspable handle portion 102. Within the head portion 100 are the scanning optics, for example those shown schematically in FIG. 2. At the front end of the head portion 100 is a window 104 through which the scanning laser beam (not shown) exits the housing, when scanning is initiated by the user pressing the trigger 106. Information on the detected bar code symbol or other indicia is passed out of the scanner along a lead 108 to a base unit (not shown). Strain relief is provided by a flexible strain-relief element 109.

The housing incorporates front and rear feet 110,112, enabling the scanner to be laid down in the position shown on a flat desk top or other surface 114 (FIG. 6a).

One method of achieving multiple working distances, for example within a bar code scanner, has already been described with reference to FIG. 1a. Reference should now be made to FIG. 11 which shows an alternative approach.

This embodiment incorporates dual laser assemblies 1310, 1311 emitting parallel beams. The laser assembly 1310 is focused for short-range operation. This will be referred to, for shorthand, as the "short-range laser". Similarly, the laser assembly 1311 is focused for long-range operation. This will be referred to, for shorthand, as the "long-range laser". Appropriate optics 1312, 1314 define the working range and different beam profile characteristics of the lasers. Alternatively, the short-range laser, and its optics, may be identical with the long-range laser and its optics.

The beam from the long-range laser 1311 is reflected by a pair of parallel angled mirrors (or by an appropriately shaped prism) so that the two resultant laser beams are closely parallel to each other. The beams impinge upon a scanning mirror 1322 from which they are reflected onto an indicia to be read (not shown, but off to the left of the drawing in FIG. 11).

Instead of there being separate long range and short range lasers, a single laser could be used instead with appropriate optics (for example a beam splitter).

Light reflected back from the indicia is collected by the mirror 1322 (which acts as a collection mirror as well as a scanning mirror) and is directed to a photodetector 1324).

Figure 12:
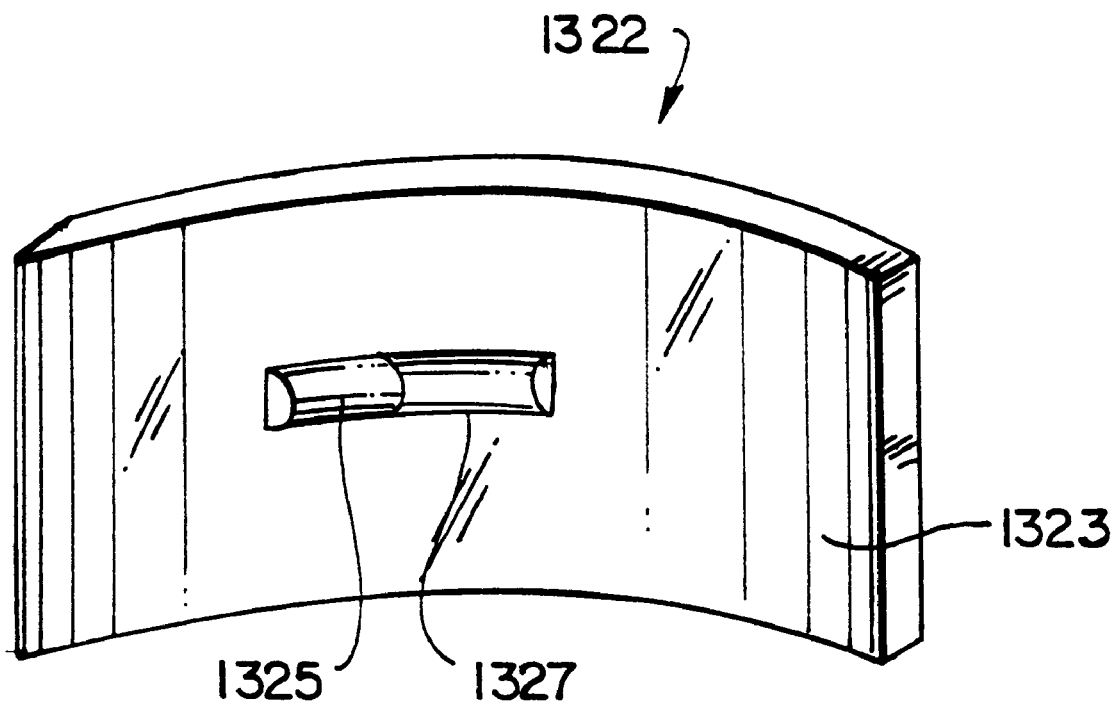
FIG. 12 shows in more detail a segmented scan mirror used in the embodiment of FIG. 11.

Details of the mirror 1322 are shown in FIG. 12. As will be seen, the mirror is generally curved, and includes a large area of collecting surface 1323 with a central section which is split into two. The left side of the central section 1325 has a cylindrical profile, and the right hand section 1327 a flat profile. The light beam from the short-range laser 1310 impinges upon the portion 1325, and the light from the long-range laser 1311 impinges upon the portion 1327.

In use, a laser control 1326 operates the lasers so that they are switched on and off alternately. The system is controlled so that two scans (left to right, then right to left) are performed with the long-range laser on, and then two scans with the short-range laser on. The alternation continues until a successful decode has been achieved.

The system also provides for an aiming mode which is initiated by a user selecting a first position of a trigger 1328 on the scanner housing 1330. In this mode, the controller 1326 causes the long-range laser 1311 to blink on and off while moving the mirror 1322. In this mode the user can easily see the scanning beam and he can align the indicia accordingly. As soon as the indicia has been properly aligned with respect to the scanner, the user moves the trigger 1328 to a second position to commence scanning proper.

In another embodiment, the laser assemblies 1310, 1311 have lasers of different frequencies. Visible laser diodes are now available in two different wavelengths, 635 mm and 670 mm. The shorter wavelength device (635 mm) is more visible to the eye, and may preferably be used in high ambient light conditions or for aiming. Thus, in the preferred implementation, the 670 mm laser diode could be focused as the "short range laser" and the 635 mm laser diode focused as the "long range laser" since at long range the brightest beam is desirable for visibility and aiming. In high ambient light conditions, it is possible to use both lasers on, rather than alternate between the lasers. Although there will be two beams, if the beams are properly focused at the target plane so the spots are overlapping or very closely adjacent, the bar code symbol can be effectively read.

In still another embodiment, one of the laser assemblies 1310, 1311 is a visible laser and the other assembly an IR laser, whose beam is generally not visible to the eye. IR lasers are suitable for use in applications such as reading security badges that require an IR reading beam, reading direct thermal printed bar codes; and reading certain colored bar codes. The same arrangement as shown in FIG. 11 may be used, except there is no limitation that the optics be "short range" or "long range". As in the previous embodiment, one can alternate scans between lasers or use both lasers on.

Figure 7:
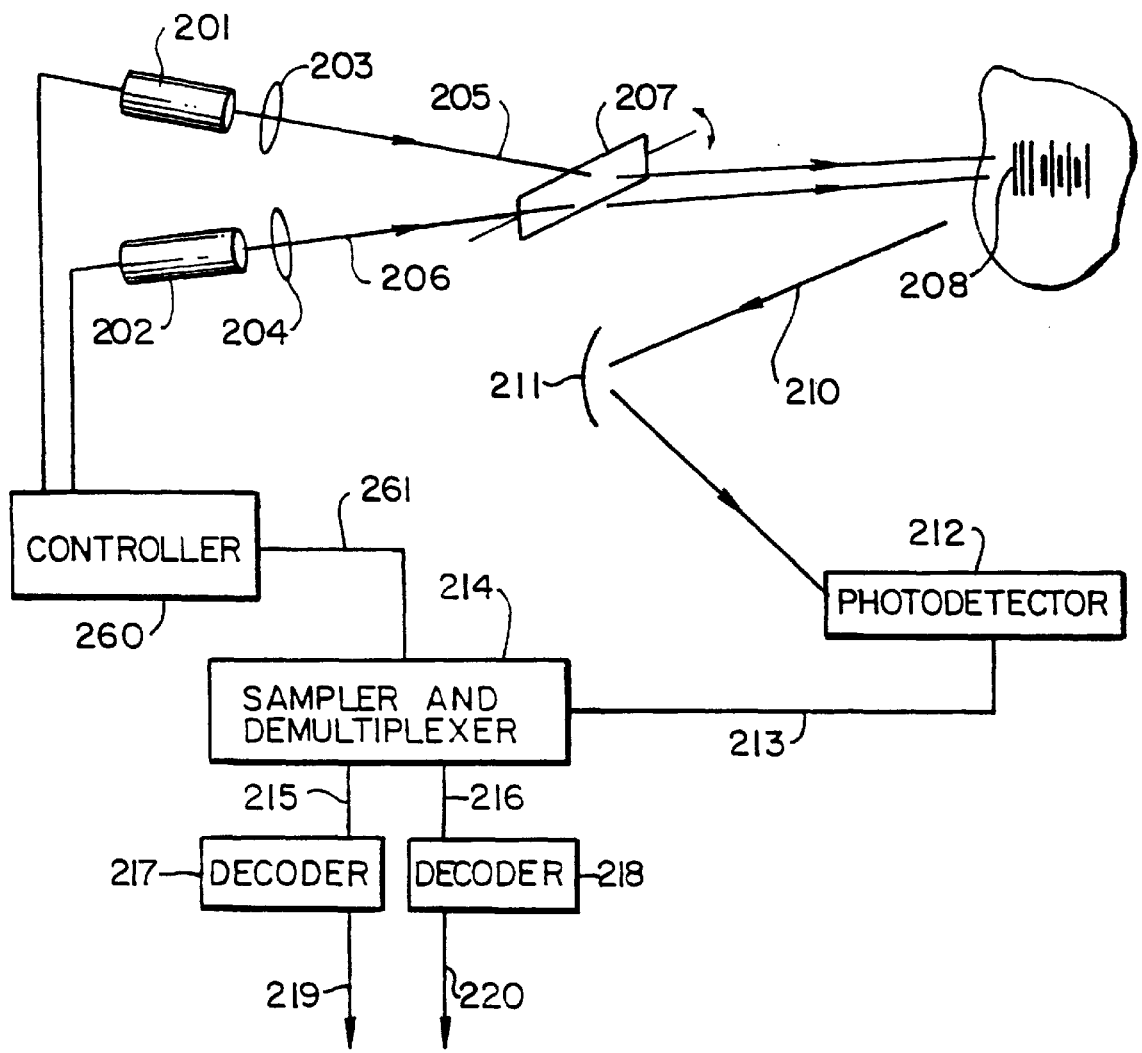
FIG. 7 schematically illustrates an embodiment of a scanner having two pulse-mode operated lasers.

Yet another embodiment is shown in FIG. 7. Here lasers 201,202 are used, each having its own separate focusing optics 203,204. The optics differ in focal length, giving the two laser beams 205,206 differing points of focus and hence differing working ranges. Both beams are scanned by a scanning mechanism such as an oscillating mirror 207, and are directed towards an indicia 208 to be read. It will be understood that because of the differing focus lengths of the optics 203,204, only one of the two scanning beams will properly be in focus at the indicia 208. If the distance to the indicia is small, the beam corresponding to the optics of shorter focal length will be in focus; if the distance is large, the other beam will be in focus.

Light 210 which has been reflected from the indicia 208 is collected by a collecting mirror 211, and passed to a photodetector 212. This produces an electrical output signal on a line 213 which is representative of the changes in intensity within the reflected light.

The lasers 201,202 are repeatedly pulsed by a controller 260, at the same rate but out of phase so that one laser is on while the other is off. The controller also sends a signal along a line 261 to a time divisional sampler and demultiplexer 214 which accepts as input the signals on the line 213, and separates them out into a first pulse stream on a line 215 representing pulses from the first laser 201, and a second pulse stream on a second line 216 representing pulses from the second laser 202. In order to ensure that the sampling is accurate, the time division demultiplexer 214 samples at a rate greater than the Nyquist limit (twice the highest frequency contained in the signal on the line 213).

The individual pulse streams on the lines 215,216 are each individually processed by respective decoders 217,218 to provide respective high level outputs 219,220. The simultaneous processing/decoding allows for the indicia 208 to be decoded without delay, regardless of whether it is positioned at a distance suitable for scanning by the laser 201, or at a distance suitable for scanning by the laser 202. It will be understood, of course, that typically only one of the decoders 217,218 will produce a "valid decode" output for a given indicia at a given distance from the scanner.

Figure 8:
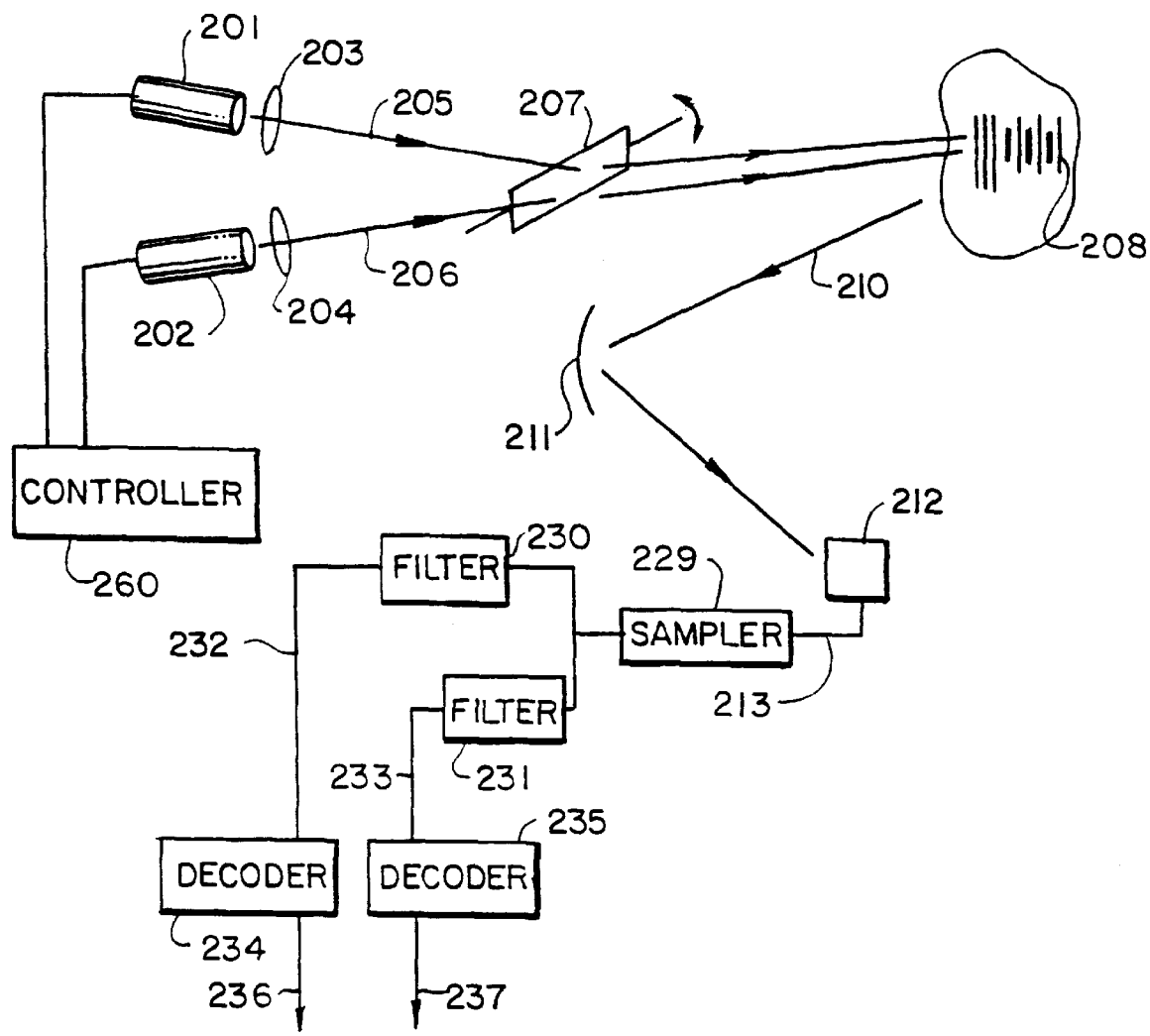
FIG. 8 shows a variation on the embodiment of FIG. 7.

FIG. 8 shows a variant of the embodiment of FIG. 7, with identical elements being given identical reference numerals. In this variant, the lasers are pulsed by the controller 260 at two different and unrelated frequencies. For the sake of discussion it will be assumed that the laser 201 is pulsed at a frequency $f_1$, and the laser 202 at a frequency $f_2$; it will further be assumed that the signal bandwidth is $f_s$.

The output signal on the line 213 is then sampled at 229, and the sampled signal is passed through two bandpass filters 230,231. The filter 230 has a passband of $f_1$ plus or minus $f_s$, whereas the second filter 231 has a passband of $f_2$ plus or minus $f_s$. This filtering separates the output of the two lasers in the frequency domain, so that the output of the filter 230 on the line 232 represents the signal just from the laser 201, and the output from the filter 231 on the line 233 represents just the other laser 202. The two signals are processed/decoded simultaneously by respective decoders 234,235 to produce individual outputs 236,237. As before, this simultaneous decoding eliminates delay.

In either the embodiment of FIG. 11, or the embodiments of FIGS. 7 and 8, the laser beams may if desired be directed onto two separate regions within the field of view. This could be achieved either by providing an appropriate spacing between the parallel laser beams, or by arranging for the laser beams to be slightly out of parallel alignment. The light which has been reflected from the two respective regions in the field of view may then be sensed simultaneously to produce two data streams which are related to the detected light intensity in the respective two regions. From those two data streams, a single decoded representation may be derived.

Depending on the set-up of the lasers, the reflected light from the two regions may differ either in intensity, frequency, or pulsing frequency. Such differences provide a convenient way of discriminating between light which has been reflected from the individual regions, thereby enabling the two data streams to be conveniently separated. This applies whether the two regions are entirely separate from each other within the field of view, or whether they overlap.

It will be understood that both the embodiment of FIG. 7 and the variation of FIG. 8 is not restricted to the use of exactly two lasers. As many lasers may be used as is required, with different working ranges for each.

In some implementations it may be desirable not only to change the working distance, but also to change the scan pattern generated by an optical scanner. This may be achieved by means of the embodiment of FIG. 9.

A laser 300 generates a beam 302 which is focused and shaped by beam optics 304 and directed to a stationary flat mirror 306. The beam is reflected from the mirror and onto a rotating polygon 308, which is driven for rotation about an axis 309. The reflections from the polygon produce a scanning laser beam 310.

Figure 10A:
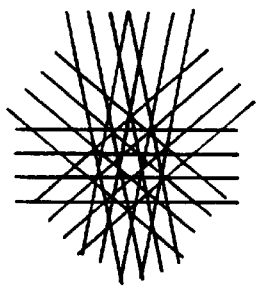
FIGS. 10a to 10c show scan patterns generated by the embodiment of FIG. 9.

The scanning beam next impinges upon an arrangement of fixed mirrors 312 in a crown configuration, with the various reflections 314 from the individual mirrors making up the crown, as the scanning beam 310 moves across, resulting in the omni-directional scan pattern shown in FIG. 10a. In order to achieve this pattern, all of the reflecting surfaces are appropriately coated to provide a high level of reflectivity at the wavelength of the laser 300 (preferably 670 nm).

Figure 9:
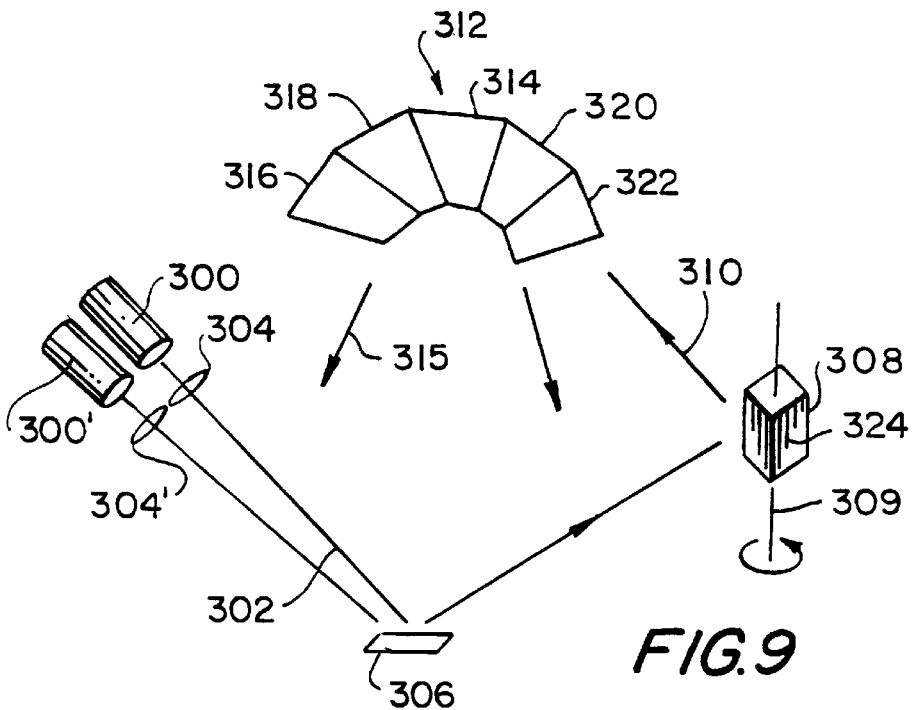
FIG. 9 illustrates the use of filtered optics to implement multi-scan pattern generation.
Figure 10B:
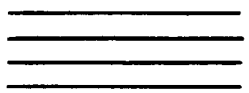
Figure 10C:

The scanning mechanism shown in FIG. 9 further includes an additional laser 300' having its own optics array 304'. This laser operates at a different wavelength than the laser 300, and preferably at a wavelength of about 630 nm. By coating only some of the relevant surfaces for reflection at 630 nm, other scan patterns may be generated. For example, if only the central mirror element 314 of the crown is coated for reflection at 630 nm, the scan pattern of FIG. 10b may be generated. Other scan patterns could be created by selectively coating one or more of the other mirror elements 316, 318, 320, 322. In addition, further permutations may be obtained by coating only some of the surfaces of the rotating polygon 308 for reflection at 630 nm. For example, if only one surface 324 of the polygon is coated, along with the central mirror element 314 of the crown, one can obtain the single line scan pattern shown in FIG. 10c.

By coating all of the relevant surfaces for reflection at 670 nm, and only some of the surfaces for reflection at 630 nm, two different scan patterns may be generated by user selection or automatic selection of the appropriate laser. Manual selection could be achieved by means of a user-operable trigger, such as the trigger 3 shown in FIG. 2; automatic control could be achieved by arranging for the scanner to detect the type of bar code symbol being scanned, and automatically selecting the scan pattern accordingly.

A further benefit of the method is that the 630 nm beam may be focused differently from the 670 nm beam.

It will be understood of course that more than two lasers could be used, each having a different wavelength. The described wavelengths of 670 and 630 nm, while preferred, could be varied if necessary accordingly to the particular application.

It will be appreciated, in connection with FIG. 9, that a variety of other methods could be used to achieve the same effect. In FIG. 9, the beams of differing wavelengths are selected by means of coatings, but of course it would also be possible to select the beams by conventional filters attached to or positioned in front of the mirrors. It would also be possible to separate the wavelengths using holographic elements and/or diffraction gratings. Where coatings are used they may be applied, as a thick layer, to a conventional mirror, thereby acting as a conventional filter to block light of a certain wavelength. Alternatively, the coatings may be a thin layer, arranged to reinforce or to cancel out the incident waveform by optical interference techniques.

While the optical system of FIG. 1 has been described in relation to a bar code reader it will be appreciated that it could equally be used in any optical arrangement requiring differing worldng ranges. For example the invention could be used in conjunction with a CD ROM pick-up, a camera, a telescope or other optical systems.

While the invention has been illustrated and described with reference to a number of particular embodiments, it is not intended to be limited to any of the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention. Accordingly, such adaptations should be and are intended to be comprehended within the meaning and range of equivalence of the following claims.

According to another aspect of the present invention there is provided an optical scanner for scanning indicia having areas of different light reflectivity, comprising:

a light source for producing a light beam;

a scanning optical element for receiving the light beam and producing a scanning light beam therefrom; and a beam-shaping reflector comprising an aplanar mirror for shaping the beam.

By reflecting from an aplanar surface, any desirable beam shape may be achieved. If the reflector is shaped both in the X direction and in the Y direction, beam shaping in both dimensions may be achieved. Alternatively, if a cylindrical mirror is used, the beam may be shaped only in one dimension. The aplanar surface may comprise the scanning mirror, or alternatively a stationary fold mirror.

Proper beam shaping using a cylindrical mirror in this way can enable the designer to reduce the spot size in the vertical (Y) direction at large scanning distances. This improves visibility. In addition, spot size for near distances (0–30 inches) is increased, thereby improving dot matrix performance.

In addition, the shaping may be carried out by reflecting the light beam from one or more stationary mirrors either after or before the light has impinged upon a scanning element. In its most general form, beam shaping is carried out by reflecting the beam from one or more aplanar surfaces.

Figure 13:
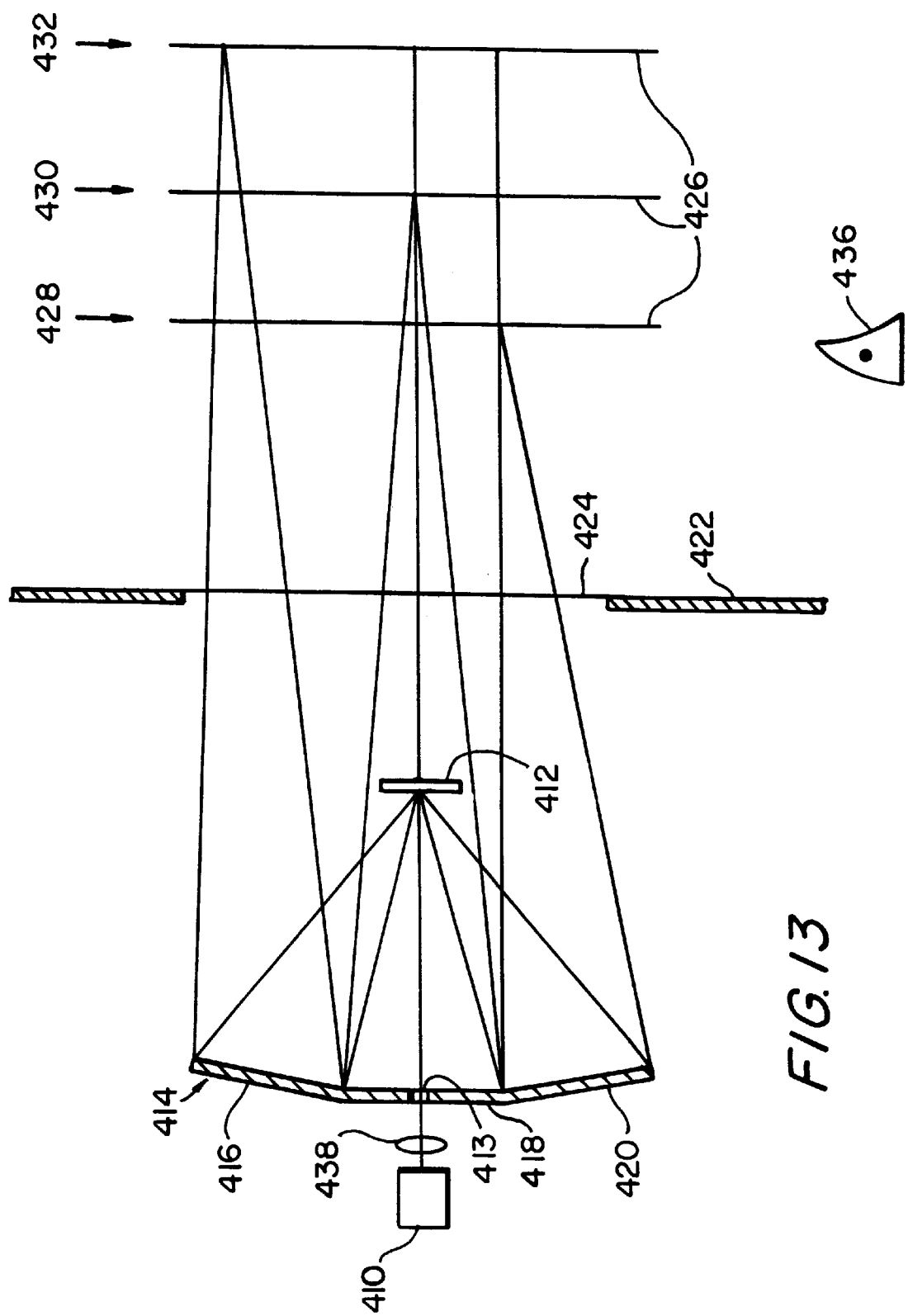
FIG. 13 shows a laser scanner according to another embodiment of the present invention.

FIG. 13 shows a multiple-range laser scanner, for example for a bar code reader, comprising a first embodiment of the present invention. In the embodiment shown, a laser diode 400 produces a light beam which is directed to a scanning mirror 412 via a small central hole 413 in a fold mirror 414. The fold mirror 414 is a segmented or multiple mirror comprising three separate mirror portions 416, 418, 420. The mirror portion 416 is convex, the mirror portion 418 is planar and the mirror portion 420 is concave. As the scanning light beam produced by the scanning mirror 412 moves across the fold mirror 414 it strikes each of the mirror portions 416, 418, 420 in turn. The light reflected from the fold mirror passes out of the scanner housing 422 through a window or aperture 424 to impinge upon an indicia 426 to be read.

The indicia 426 is shown at three possible positions, a near position 428 corresponding to the working distance of the mirror portion 420, a middle distance 430 corresponding to the working distance of the mirror portion 418, and a far distance 432 corresponding to the working portion of the mirror portion 416. It will be appreciated, of course, that in a practical embodiment there will be considerably greater spacing between the positions 428, 430 and 432: in the drawing the spacings are shown closer than they would be in reality, merely for the sake of clarity.

The result of the three separate mirror portions is that three separate scan lines are produced, the first at the position 428, the second at the position 430 and the third at the position 432. The intention is, accordingly, that whatever the distance of the indicia 426 from the scanner, it has a very good chance of being read by at least one of the scan lines. It will be appreciated of course that the indicia does not need to be exactly at one of the distances 428, 430, 432 in order to be decodable; there is in each case a substantial depth of field, and depending upon the actual distances these depths of field may even overlap so that they effectively merge into one complete "working region" within which the bar code symbol will almost certainly be decodable.

The mirror portions are suitably angled so that the respective scan lines lie on top of one another, but are merely focused at different distances.

It is not essential that there are exactly three mirror portions; there could be two, or more than three, according to the requirements of the particular application. The exact mirror profiles may also be chosen according to the particular application (e.g., cylindrical). The profiles chosen will depend upon the required working ranges and also upon the profile of the scanning mirror 412. The scanning mirror 412 may preferably be flat, but may in some circumstances be aplanar, for example cylindrical or spherical. The mirror 412 could also be replaced by a rotating prism, polygon, hologram, lens, zone plate, or any other convenient optical scanning element. If the scanning element comprises a polygon, each facet of the polygon may have a different curvature. In that case, the mirror portions 416, 418, 420 may (but need not) all have the same profile since the multiple working distances may then be determined by the curvature of the polygon facets. An exemplary polygon suitable for use with three planar fold mirror portions is shown at 436.

Further shaping of the beam may be achieved by the use of optics 438 in front of the laser 410.

In the embodiment of FIG. 13, light reflected back from the indicia 426 may either follow substantially the same path, in the reverse direction, to a photodetector (not shown) or alternatively there may be separate light collector optics (not shown) for that purpose.

What is claimed is:

1. An optical scanner for scanning indicia having areas of different light reflectivity, comprising:

a light source for producing a light beam; and a scanning optical element for receiving the light beam and producing a scanning light beam therefrom, and a stationary, beam-shaping fold mirror comprising a cylindrical mirror for shaping the light beam.

2. An optical scanner for scanning indicia, the scanner comprising:

a light source producing a light beam that converges in both x and y directions so that the light beam has a waist in both the x and y directions, where x and y are orthogonal directions; and a scanning element positioned to receive the light beam and reflect the light beam in a scanning motion along the x direction across the indicia, and a stationary fold mirror including a convex beam-shaping surface shaped to diverge light in the y direction to at least reduce convergence of the light beam in the y direction.

3. The optical scanner of claim 2, wherein the convex surface is substantially cylindrical about an axis extending in the x direction so as to produce divergence of light in the y direction.

4. In an optical scanner for reading indicia having parts of different light reflectivity, the scanner having a laser light source, a reciprocally oscillatable scanning mirror for reflecting light from the light source to the indicia in a scan across the indicia thereby reflecting light of variable light intensity off the indicia, and a light sensor for detecting at least a portion of the light reflected off the indicia and generating an electrical signal indicative of the detected light intensity, an optical component comprising:

a stationary mirror having a generally concave first surface portion for collecting at least a portion of the light reflected off the indicia, and for directing the collected portion of light to the light sensor, and a generally aplanar second surface portion for directing the light from the light source to the scanning mirror.

5. An optical scanner for scanning indicia such as bar code symbols, comprising:

a laser source comprising a laser diode for producing a light beam along a path, the light beam having a profile that converges in both x and y directions so that the beam has a waist in each of the respective x and y directions, where x and y are orthogonal directions in a plane substantially orthogonal to the path of the light beam;

a convex mirror disposed in the path of the light beam from the laser source and shaped to diverge light in the y direction; and a scanning element positioned to receive the light beam and functioning to move the light beam in a scanning motion along the x direction across the indicia.

6. In an optical scanner for scanning indicia, the scanner including a photodetector for detecting light of variable intensity reflected from the indicia and for generating an electrical signal indicative of the detected light intensity, an arrangement comprising:

a light source for emitting a laser beam;

a scanning element disposed in a path of the emitted laser beam and operative to reflect the laser beam in a scanning path for scanning indicia; and a stationary multi-surface fold mirror having a first surface with a concave curvature positioned for collecting and reflecting the light reflected from the indicia for receipt by the photodetector, and at least a second beam shaping surface located substantially in a central region of the fold mirror and having a convex curvature for shaping the emitted laser beam, wherein the second beam shaping surface is positioned to reflect the emitted laser beam either as the beam passes from the light source to the scanning element or from the s g element to the indicia.

7. The arrangement of claim 6, wherein the light source is a laser diode.

8. The arrangement of claim 6, wherein the second beam shaping surface is larger in area than the first surface.

9. The arrangement of claim 6, wherein the convex curvature of the second beam shaping surface is cylindrical.

10. The arrangement of claim 6, wherein the second beam shaping surface is positioned to reflect the emitted laser beam as the beam passes from the light source to the scanning element.

11. The arrangement of claim 6, wherein the second beam shaping surface is positioned to reflect the emitted laser beam as the beam passes from the scanning element to the indicia.

* * * * *

UNITED STATES PATENT AND TRADEMARK OFFICE
CERTIFICATE OF CORRECTION

PATENT NO. : 6,220,514 B1  
DATED : April 24, 2001  
INVENTOR(S) : Paul Dvorkis et al.

It is certified that error appears in the above-identified patent and that said Letters Patent is hereby corrected as shown below:

Title page,  
Item [75], Inventors, replace with the following:  
-- Paul Dvorkis, Stony Brook;  
  Edward Barkan, Miller Place;  
  Boris Metlitsky, Stony Brook;  
  all of NY (US) --.

Signed and Sealed this

Eleventh Day of October, 2005

JON W. DUDAS  
*Director of the United States Patent and Trademark Office*